(No Model.)

H. F. RICE.
PATTERN CHAIN BAR FOR LOOMS.

No. 283,816. Patented Aug. 28, 1883.

Witnesses;
John C. Dewey
Chas. D. Gay

Inventor;
Henry F. Rice

UNITED STATES PATENT OFFICE.

HENRY F. RICE, OF SUTTON, MASSACHUSETTS.

PATTERN-CHAIN BAR FOR LOOMS.

SPECIFICATION forming part of Letters Patent No. 283,816, dated August 28, 1883.

Application filed February 23, 1883. (No model.)

*To all whom it may concern:*

Be it known that I, HENRY F. RICE, of Sutton, county of Worcester, and Commonwealth of Massachusetts, have invented certain new and useful Improvements in Pattern-Chain Bars for Looms; and I do hereby declare that the following is a full, clear, and exact description of the same, reference being had to the accompanying drawings, forming a part of this specification, and in which—

Figure 1:
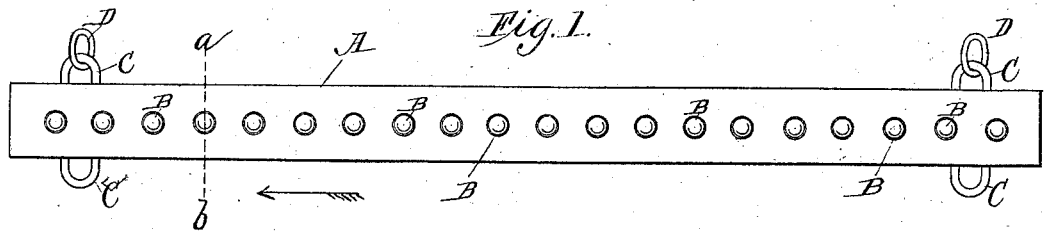
Figure 2:
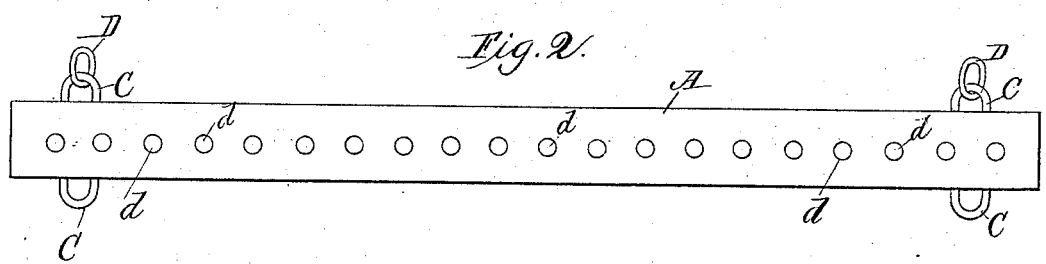
Figure 3:
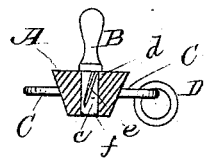
Figure 4:
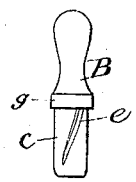
Figure 5:
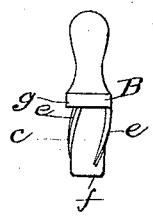

Figure 1 represents a top or plan view of one of my improved pattern-bars with the pattern-pins in place. Fig. 2 represents the pattern-bar shown in Fig. 1 with the pins removed. Fig. 3 represents a cross-section taken on line $a\ b$, Fig. 1, looking in the direction of the arrow, same figure, the pattern-pin being shown in elevation; and Figs. 4 and 5 represent different views of pattern-pins on an enlarged scale.

The object of my invention is to provide the pattern-chain bars of looms with pattern-pins so constructed that when applied to the bars they will be securely held in place, and yet may be repeatedly inserted in and removed from the bars without appreciably enlarging the holes therein, thus avoiding the liability of the pins becoming loose.

To this end my invention consists in the combination, with a pattern-chain bar having a series of holes extending entirely through the same, of a series of pattern-pins formed blunt at both ends, and having their shanks provided with one or more threads or ridges.

To enable those skilled in the art to which my invention belongs to make and use the same, I will proceed to describe it more in detail.

In the drawings, the part marked A is the pattern-bar, made of wood, of suitable length and breadth, and of a thickness equal to the length of the shank $c$ of the pattern-pin B. said bar A is provided with a series of holes, $d$, extending entirely through the same, and preferably arranged along its center longitudinally. The holes $d$ are made a little smaller in diameter than the diameter of the shank $c$ of the pattern-pins B, for the purpose to be hereinafter described.

B indicates the pattern-pins, which are formed blunt at both ends, so that they may be readily driven into or out of the holes $d$ of the pattern-bars. Said pins are preferably made round in form, and of cast metal, and the shanks $c$ (or portions thereof which are to enter the holes in the pattern-bars) are provided with one or more threads or ridges, which latter are preferably slightly curved or spiral in form, and extend longitudinally of said shanks, as clearly shown in the drawings. Said pins are also preferably provided with shoulders $g$, to prevent them from being driven too far into the holes in the pattern-bars.

The pattern-pins B are combined with the pattern-bar A by inserting the ends $f$ of the pins B in the holes $d$ of the bar A, which holes are made a little smaller than the diameter of the shanks $c$ of said pins, as before stated, and then hammering on the heads of the pins until they are driven into the bar the length of the shank $c$. (See Fig. 3.) The pins are removed from the pattern-bar by hammering on the ends $f$ of the pins from the under side of the bar A.

It will be readily seen that, the shanks of my pattern-pins being provided with the threads or ridges $e$, the pins, when driven into the holes $d$, are held firmly in place and prevented from being drawn out.

It will also be observed that one of the pins may be used a large number of times in the same hole in the bar A without making the hole so large as to prevent the shank of the pin from being held firmly therein, for the reason that the threads or ridges $e$ only make a depression in the wood of the bar A, and can be inserted a number of times, each time making a new depression, and still not increasing to any appreciable extent the size of the holes $d$.

A chain of any desired length, according to the length of the pattern to be produced in the fabric, is obtained by connecting together a number of the bars A by loops C and rings D, to form an endless chain, which is carried around on a grooved cylinder constructed and operated in the usual way on looms which use this class of pattern-chains.

The pattern-pins B are made of any suitable metal, and may be cast with only one thread or ridge $e$ on the shank $c$ thereof, or with two threads or ridges *e*, or with a greater number, if found desirable, though I prefer to have them cast with two threads or ridges *e*, as shown in Fig. 5 of the drawings.

Having described my improvements in pattern-chain bars or looms, what I claim therein as new and of my invention, and desire to secure by Letters Patent, is—

The combination, with a loom pattern-bar provided with a series of holes extending entirely through the same, of a series of pattern-pins formed blunt at both ends, the shanks of said pins being provided with one or more threads or ridges, substantially as hereinbefore set forth.

HENRY F. RICE.

Witnesses:
 JOHN C. DEWEY,
 CHAS. D. GAY.